United States Patent

Morrow

[15] 3,671,422
[45] June 20, 1972

[54] WATER POLLUTION ABATEMENT IN A PETROLEUM REFINERY

[72] Inventor: Terry R. Morrow, Tonawanda, N.Y.
[73] Assignee: Mobil Oil Corporation
[22] Filed: Nov. 13, 1970
[21] Appl. No.: 89,207

[52] U.S. Cl...................208/79, 208/70, 208/97, 208/141, 208/370, 260/627 B
[51] Int. Cl.....................C07c 37/22, C01g 37/10
[58] Field of Search.............208/79, 70, 141, 97, 370; 260/627 B

[56] References Cited

UNITED STATES PATENTS

| | | |
|---|---|---|
| 2,683,752 | 7/1954 | Stanley et al..................260/627 B |
| 2,773,003 | 12/1956 | Brown et al......................208/370 |
| 2,785,120 | 3/1957 | Metcalf...........................204/190 |
| 2,927,075 | 3/1960 | Brown............................208/208 |
| 2,999,808 | 9/1961 | Brown............................208/264 |
| 3,304,253 | 2/1967 | Lewis.............................208/97 |

FOREIGN PATENTS OR APPLICATIONS 1,350,870 12/1963 France

*Primary Examiner*—Delbert E. Gantz
*Assistant Examiner*—G. E. Schmitkons
*Attorney*—Oswald G. Hayes, Andrew L. Gaboriault and Carl D. Farnsworth

[57] ABSTRACT

The processing of refinery waters to recover phenolic constituents of catalytic cracking by adsorption with light process naphthas passed to catalytic reforming is discussed.

4 Claims, 1 Drawing Figure

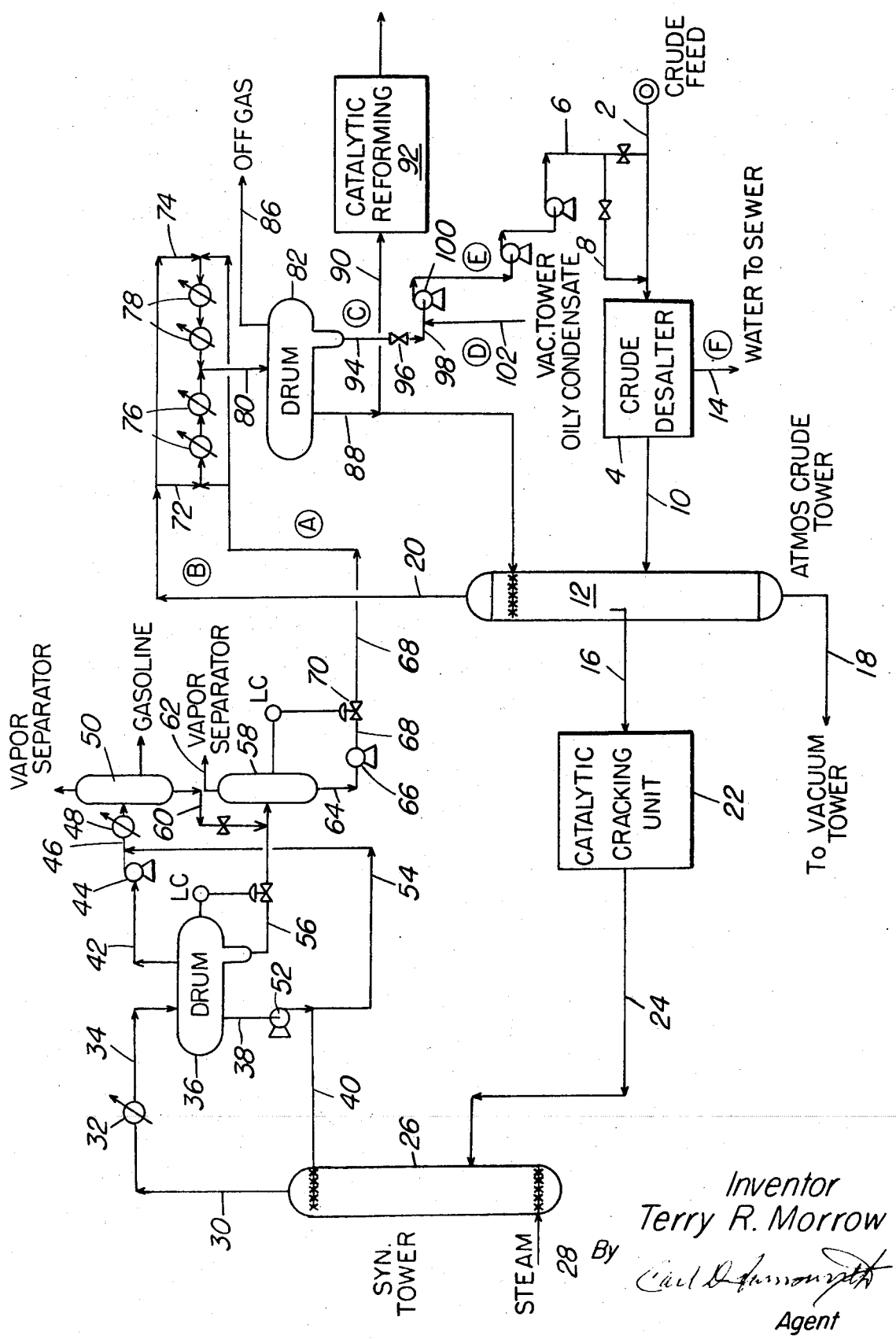

WATER POLLUTION ABATEMENT IN A PETROLEUM REFINERY

BACKGROUND OF THE INVENTION

In refinery operations processing crude oils to yield gasoline, kerosine, home heating fuels, diesel and industrial fuels and other products, the processing of the crude oil usually begins with a desalting operation which is then followed by distillation wherein a physical separation of the crude oil is made. The fractions obtained from such a distillation operation are further refined and upgraded in several different processing units comprising the refinery operation such as catalytic reforming, catalytic cracking, alkylation, hydrocracking in combination with treating processes and blending of finished products. In a refinery operation processing approximately 40,000 barrels of crude oil per stream day, water is an essential commodity for effecting cooling, condensing and stripping in relatively large quantities approximating of the order of about 26 million gallons per day of water. Thus it is imperative that such large volumes of water be treated so that unnecessary contamination of the streams to which the water is returned will be minimized if not completely avoided.

SUMMARY OF THE INVENTION

The present invention is concerned with purification of refinery waters used primarily for effecting cooling, condensing and stripping of hydrocarbon streams.

In a refinery operation to which the present invention is specifically associated a crude distillation tower following a desalting operation is used to perform a physical separation of the hydrocarbons comprising the crude oil charge. To effect this physical separation of the crude, the crude oil is pumped through a series of heat exchange means not shown on the attached drawing to preheat the oil to a desired elevated temperature in the range of from about 200° to 220° F. before entering a desalting vessel such as, for example, an electrostatic desalting vessel, wherein water, salts and sediments are extracted from the crude oil. To assure intimate mixing between the crude and water, an emulsion is formed by passing the two through an emulsifier. The water-oil emulsion is then introduced into an electrostatic field which causes the water droplets to agglomerate and settle out. In this operation the water and sediment are drawn off for further treatment as desired and passed to the refinery sewer system. The desalted oil is passed through additional heat exchangers not shown prior to entering a preheat furnace associated with the atmospheric distillation tower wherein the desalted oil is heated to an elevated temperature in the range of from about 630° F. to about 660° F. before entering the main or atmospheric distillation tower. As the oil liquid-vapor mixture enters the atmospheric distillation tower the light hydrocarbon fractions comprising gasoline, naphtha and kerosine are separated, condensed and cooled in, for example, water cooled heat exchangers. The heavier liquid hydrocarbons or reduced crude are withdrawn and are further heated prior to entering a vacuum distillation tower for further separation. In the vacuum tower, a vacuum gas oil and heavy residual oils are withdrawn and are used as catalytic cracking and asphalt charge stocks respectively. In effecting distillation of the crude, briefly described above, water is used as follows:

a. for cooling the atmospheric fractionator overhead to effect condensing of gasoline and lighter hydrocarbons,
b. for cooling the vacuum fractionator overhead to effect condensing of hydrocarbons as well as steam used in the vacuum jets associated with the tower,
c. for cooling of reflux streams returned to the atmospheric and vacuum distillation towers and for cooling most products leaving the unit area for further processing, and
d. for jacketing pumps.

In addition to the above, water and a desalting chemical are added to the crude to contact the residual water, dissolved salts comprising chlorides of sodium, magnesium and calcium as well as solid material comprising silt, iron oxides, sand, crystalline salt, carbon and sulfur. After thorough mixing in the desalter the accumulated water and sediment which settles to the bottom of the desalter is continuously withdrawn. The desalted oil is then charged through the distillation system discussed above. In the desalting operation a desalting chemical is used which is an aromatic hydrocarbon solution of oxyalkylated phenolic resins and acylated alkanolamines. In the desalting operation approximately 95 percent of the chemical often referred to as a demulsifying chemical is retained in the oil phase. The remaining 5 percent is normally withdrawn with the water passed to sewer. It is known from experience that contaminants in crude oil if not removed can cause serious damage to the distillation equipment thereby seriously limiting on-stream operating time and thus causing inefficient operation throughout the refinery operation.

In the refinery operation herein discussed steam is used to strip out the lighter materials existing in the residuum from the vacuum tower. Steam is also injected into the reduced crude as it passes through the preheat furnaces to facilitate vaporization thereof and to prevent heater tube coking. The condensates recovered from these operations and any condensate hydrocarbons are collected in the overhead condenser system. This accumulated water and oil is continuously withdrawn.

In the refinery operation herein specifically described the quantity of water used at the crude unit may approximate as much as 11 million gallons per day. It has been found in such an operation that the major pollutants entering the water system from the crude distillation operation include oil, phenols, chlorides, sulfides, and solids.

In a reforming unit comprising the refinery operation herein described, approximately 4 million gallons of water are used primarily as a coolant in the reforming process heat exchange equipment with additional minor quantities of water being used for pump cooling. A small amount of residual water contained in the naphtha charge is removed in the pretreating section of a typical reforming operation.

In the catalytic cracking unit comprising the refinery combination herein discussed heavy oil from the crude oil fractionator is refined as by catalytic cracking. As known by those skilled in the art, the catalytic cracking operation changes the chemical structure of the hydrocarbons and is thus used to upgrade the heavy oil charge to heating oil and lower boiling products such as gasoline. The cracking operation involves contacting the hydrocarbon oil charge under controlled temperature, pressure and space velocity conditions with a cracking catalyst in a fluid or downwardly moving bed catalyst operation. During the cracking operation light hydrocarbons are produced and coke is also deposited on the catalyst. The hydrocarbons formed and those incompletely converted during the cracking operation are passed to a product fractionator often referred to as a Syn. tower. The catalyst used in the cracking operation is separated from hydrocarbonaceous material as by stripping with steam and is regenerated by burning coke from the catalyst. Heat released in this regeneration operation is used in part to generate steam and the regenerated catalyst is returned to the cracking unit for reuse. In the cracking system, water usage is maintained substantially in two separate systems; a clean water system such as used in condensers and coolers and a separate oily process water system. The oily process water comprises steam condensate and is identified as the largest source of phenols, ammonia and sulfides in the refinery water system. These pollutants are formed in the cracking operation and thus a substantial portion thereof concentrates in the process steam condensate. The condensate originates from steam used in the heater tubes to minimize coking, various purge and seal steams as well as stripping steam used in the fuel oil and naphtha strippers. Most of the condensate steam accumulates in the fractionator or Syn. tower overhead accumulator wherein it separates from an oil phase and may be separately withdrawn. Water condensate is also removed from gaseous streams separated from the accumulator above discussed.

During the catalytic reforming and cracking operations, by-products are produced and recovered, some of which are subjected to further processing in, for example, an alkylation unit. In the alkylation process gaseous materials such as butylene and propylene are contacted with isobutane in the presence of an acid catalyst to produce an alkylation product of higher octane rating. In the alkylation operation again water is used primarily for effecting cooling and condensing of the light hydrocarbon streams. Water wash drums may also be utilized in this operation and this water becomes contaminated with pollutants. For example, in the alkylation operation caustic is used to remove quantities of hydrogen sulfide, mercaptans and other undesirable sulfur compounds from the olefin feed stream. In addition, caustic is used to neutralize the reactor hydrocarbon effluent to remove any remaining acid catalyst and alkyl hydrogen sulfates.

In the method of this invention, the refinery process water streams recovered from the separate processing units contain phenols, ammonia and sulfides which are combined and charged to existing processing equipment as herein described for effecting removal of accumulated phenols in addition to effecting stripping of water for the removal of ammonia and sulfides. Thereafter the cleaned water may be reused or discharged from the refinery operation and returned to the source from which obtained.

In accordance with the concept and method of the present invention phenolic waters and particularly those recovered as product of the cracking operation from the Syn. tower overhead are cooled and transferred for admixture with the atmospheric tower overhead wherein contact with a light straight run naphtha is effected and approximately at least about 60 percent of the phenols in the collected water phase are removed by extraction with the naphtha phase. The water recovered from the atmospheric tower overhead accumulator is then passed by a series of pumps to the crude unit desalter for admixture with the oil charge passed thereto wherein approximately at least about 90 percent of the phenols remaining in the water is removed. Thus, the phenols produced and collected in the water phases of the refinery are recovered substantially completely in the light naphtha or gasoline fraction separated in the operation which is passed to the reforming unit wherein the phenols are converted to aromatic compounds by hydrogenation.

In order to provide a more complete understanding of the processing sequence and combination comprising this invention for practicing water pollution abatement, reference is now had to the drawing by way of example which diagrammatically identifies one specific arrangement for practicing the concepts of this invention.

Referring now to the drawing, a crude oil charge is introduced to the process by conduit 2 for passage to desalter vessel 4. Water recovered in the process as hereinafter described at a temperature of about 105° F. and a pressure of about 250 psi is combined with crude oil feed in substantially two separate increments by conduits 6 and 8. Initially from about 1 to about 2 vol.% water is combined with the crude by way of conduit 6 with from about 5 to about 7 vol.% water thereafter combined with the crude charge by way of conduit 8. The water oil mixture thus formed is then passed to desalter 4 for removal of impurities as discussed above. The crude oil freed of contaminates in desalter 4 is then passed by conduit 10 to atmospheric fractionating tower 12. Water containing less than 1 ppm phenol is removed from desalter 4 by conduit 14.

In atmospheric tower 12, a number of fractionations are made using a pressure of about 12 psi and a bottom temperature of about 640° F. A gas oil charge for catalytic cracking is removed by conduit 16. A residual fraction is withdrawn from the bottom of fractionator 12 by conduit 18 for passage to a vacuum tower not shown. An overhead fraction containing steam is withdrawn by conduit 20 amounting to approximately 600 GPM (gallons per minute) of hydrocarbon and 20 GPM of water as process steam condensate at a pressure of about 10 psi at a temperature of about 240° F.

The gas oil charge in conduit 16 is passed to cracking unit 22 wherein it is converted to gasoline and other products typical of catalytic cracking operations. The catalyst employed in the cracking operation may be an amorphous silica-alumina cracking catalyst or one of the zeolitic cracking catalysts known in the art. The products of the cracking operation are passed by conduit 24 to fractionator tower 26. In fractionator tower 26 known in the art as a Syn. tower, the products of cracking are separated in a manner familiar to the art. Steam is usually introduced to the lower portion of the synthetic crude tower as by conduit 28 in combination with operating the tower to maintain a top temperature of about 270° F. and a tower pressure of about 10 psi.

In the processing sequence herein described, an overhead stream 30 is withdrawn from the top of Syn. tower 26 comprising steam and light hydrocarbons. This overhead stream 30 is cooled and partially condensed by coolers represented by cooler 32 and then passed by conduit 34 to drum 36. Drum 36 is maintained at a temperature of about 100° F. and a pressure of about 2 psi. A reflux hydrocarbon stream is withdrawn from drum 36 by conduit 38 with a portion thereof recycled by conduit 40 as reflux to the upper portion of tower 26. A vapor phase is withdrawn from drum 36 by conduit 42 for passage to a compressor 44 which raises the pressure of the vapor up to about 50 psi. The compressed vapors are passed by conduit 46 to cooler 48 and thence to separator drum 50. The portion of the hydrocarbon condensate in conduit 38 not returned to the tower as reflux is passed to pump 52 and then conduit 54 for admixture with compressed vaporous material in conduit 46 described above.

A water phase separated in drum 36 is withdrawn by conduit 56 in response to a level control valve and system shown. The withdrawn water phase is passed to a second separator 58 maintained at a pressure of about 2 psi and a temperature of about 100° F. In separator 50, maintained at a pressure of about 50 psi and 100° F., a vapor phase is separated from a gasoline phase and a water phase which are separately withdrawn from the separator. The water phase is removed by conduit 60 from separator 50 and combined with the water phase in conduit 56 passed to separator 58. Vaporous material is removed from the upper portion of separator 58 by conduit 62. Water condensate accumulated in separator 58 is withdrawn from the bottom thereof by conduit 64 and passed to a pump 66. Pump 66 is used to raise the pressure of the water phase up to about 130 psi. The compressed water phase is passed by conduit 68 containing level control valve 70 for admixture with the overhead vaporous phase in conduit 20 withdrawn from the upper portion of atmospheric fractionation tower 12 as hereinafter described.

The vaporous phase in conduit 20 comprising from about 600 GPM hydrocarbon and 10 to 20 gallons per minute of water is separated into two separate streams 72 and 74 for passage through a plurality cooler 76 and 78 before being combined and passed by conduit 80 to drum 82. Water condensate in conduit 68 is caused to be separated into two separate streams as shown for admixture with vaporous material in conduits 72 and 74 before being cooled.

Maintained at a temperature of about 100° F. and 6 psi pressure in drum 82, a gas phase is separated and removed therefrom by conduit 86. A hydrocarbon phase is also separated and withdrawn by conduit 88. A portion of the hydrocarbon phase comprising naphtha charge material for catalytic reforming is recycled in part as reflux to the upper portion of tower 12 with the remaining portion being passed by conduit 90 to catalytic reforming 92. As discussed and shown herein, the naphtha phase passed to catalytic reforming comprises adsorbed phenolic material collected from the water phases as herein discussed.

The water phase separated in drum 82 is removed therefrom by conduit 94 and passed through check valve 96 and conduit 98 to pump 100. A water phase recovered from a vacuum tower not shown and known as an oily condensate is added by conduit 102 at a rate in the range of from 5 to 10 gallons per minute (GPM) to the water phase in conduit 98 passed to pump 100. The combined water phase comprising from about 55 to about 80 GPM is then passed through one or more sequentially arranged pumps to raise the pressure of this water phase up to about 350 psi for admixture with the hydrocarbon charge being passed to desalter 4 as herein before discussed. The oily condensate in conduit 102 is added primarily as a source of water make up to the process since it contains little of any phenols. On the other hand, it is important to recover the oily constituent of this water stream and such is accomplished by adding it to the crude oil passing to the desalter.

The simplified flow arrangement shown and described above has been intentionally so limited to emphasize the flow of phenolic waters in the system and the recovery of phenols in the hydrocarbon phase passed to catalytic reforming. It will be apparent to those skilled in the art of petroleum processing, however, that the flow arrangement of the drawing represents only a small part of such an operation and further details of such a refinery combination may be derived from the prior art.

It is clear from an understanding of the processing sequence represented by the drawing that the concept of concentrating and recovering phenolic constituents from the water phase of a refinery operation has been accomplished in an improved and novel manner. To further emphasize this improved and novel recovery of phenolic constituents from refinery waters, reference is now had to the following table which identifies the concentrations of phenols in various streams labeled on the drawing by letters A through F.

TABLE 1

Summary of Phenol Removal Efficiency

| Stream No. | Flow (GPM) | Temp. (°F) | Phenol content PPM (wt.) | Phenol content O/D |
|---|---|---|---|---|
| A | 45 | 102 | 462 | 249 |
| B | 20 | 102 | — | — |
| C | 65 | — | 65.4 | 51 |
| D | 8 | — | — | — |
| E | 73 | 100 | — | —0 |
| F | 73 | — | <.10 | 0.88 |

Overall phenol removal efficiency = 99%
Phenol removal efficiency via light naphtha = 80%

It will be seen from the above table that the overall phenol removal efficiency is about 99 percent and that the water stream dumped to sewer from the desalter will contain less than 1 ppm phenol. A further significant observation is the efficiency with which the light naphtha removes phenols from the water streams contacted in the process. This observation is further facilitated by the following:

TABLE 2

DATA SET 1

A. Five gallons of light straight run naphtha and 1 quart of Syn. tower water were mixed and shaken for 1 hour at room temperature.

B. TEST RESULTS | PPM Phenols
--- | ---
Syn. tower phenolic water before contacting | 93.2
Syn. tower phenolic water after contacting | 9.8
Atmospheric tower overhead accumulator | 1.8
Percent phenol removal | 89.9

DATA SET 2

A. 2 ½ gallons of light straight run naphtha and 1 quart of Syn. tower water were mixed and shaken for 5 minutes at room temperature.

B. TEST RESULTS | PPM Phenols
--- | ---
Syn. tower phenolic water before contacting | 102.8
Syn. tower phenolic water after contacting | 10.4
Percent phenol removal | 89.9

In addition to the above benefits obtained by the processing concepts of this invention, it has been found that a further unexpected advantage was obtained in reducing corrosion rates throughout the atmospheric crude tower overhead system. That is, it has been found that the amount of savings due to reduced chemical addition and reduced metal loss by significantly reduced corrosion rates provided a significant economic incentive to install and practice the processing concept of this invention.

Having thus provided a general discussion of the method and concept of this invention and provided specific examples in support thereof, it is to be understood that no undue restrictions are to be imposed by reason thereof except as provided by the claims attached.

I claim:

1. A method for recovering phenolic constituents of catalytic cracking found in steam condensate streams of a catalytic cracking operation which comprises accumulating phenolic constituents of catalytic cracking condensate waters in a light naphtha hydrocarbon phase by contact therewith under conditions of temperature and pressure promoting absorption of phenols by the naphtha, passing the naphtha phase comprising absorbed phenols to catalytic reforming and employing condensate waters reduced in phenol content to remove contaminates from crude oil charged to a desalting operation providing oil feed for the cracking step.

2. In a refinery operation comprising crude oil distillation in combination with atmospheric distillation of the charge and vacuum distillation of high boiling constituents therefrom, catalytic cracking of gas oil constituents of said distillation, product fractionation of said catalytic cracking and reforming of naphtha boiling material the improvement for recovering phenols from the condensate water phase of said catalytic cracking operation which comprises accumulating water phase phenolic constituents of catalytic cracking by cooling vaporous material to obtain a first hydrocarbon phase separate from a first water condensate phase and a vapor phase, refluxing a portion of the first hydrocarbon phase to the upper portion of a product fractionation tower from which it came, recontacting the remaining portion of the first hydrocarbon phase with the vaporous phase at a higher pressure than employed in the first separation step, cooling and effecting a further separation of the combined vaporous hydrocarbon phase to recover a second vaporous material separately from a gasoline phase and a second water phase, combining the first water phase with the second water phase, combining overhead vaporous material comprising light straight run naphtha obtained from atmospheric distillation maintained at a temperature of about 240° F. in the upper portion thereof with said combined water phases, cooling the combined water phases to a temperature of about 100° F. and thereafter separating to form a third water phase separate from a light hydrocarbon phase comprising naphtha and a vapor phase, refluxing a portion of said light hydrocarbon phase to the upper portion of said atmospheric distillation and passing the remaining portion thereof to catalytic reforming, combining vacuum tower oily condensate waters with said third water phase and employing the thus combined waters for desalting of a crude oil charge before passing the charge to the above identified atmospheric distillation tower.

3. In a refinery operation wherein phenolic constituents produced in the process become concentrated in water condensate streams of the operation, the method of removing these phenolic constituents from the refinery waters which comprises combining water streams containing phenolic constituents and contacting the thus combined phenolic water with a naphtha product of atmospheric distillation under conditions to effect absorption of phenols by said naphtha, passing naphtha with absorbed phenols to catalytic reforming and employing water from which phenols have been removed to effect desalting of said crude oil charge prior to effecting atmospheric distillation thereof.

4. The method of claim 3 wherein oily condensate waters obtained from vacuum distillation are employed as make-up waters to the operation and are combined with the waters employed to effect desalting of the crude oil charge.

* * * * *